W. M. FULTON.
AUTOMATIC RADIATOR.
APPLICATION FILED JULY 5, 1916.
1,251,214.
Patented Dec. 25, 1917.
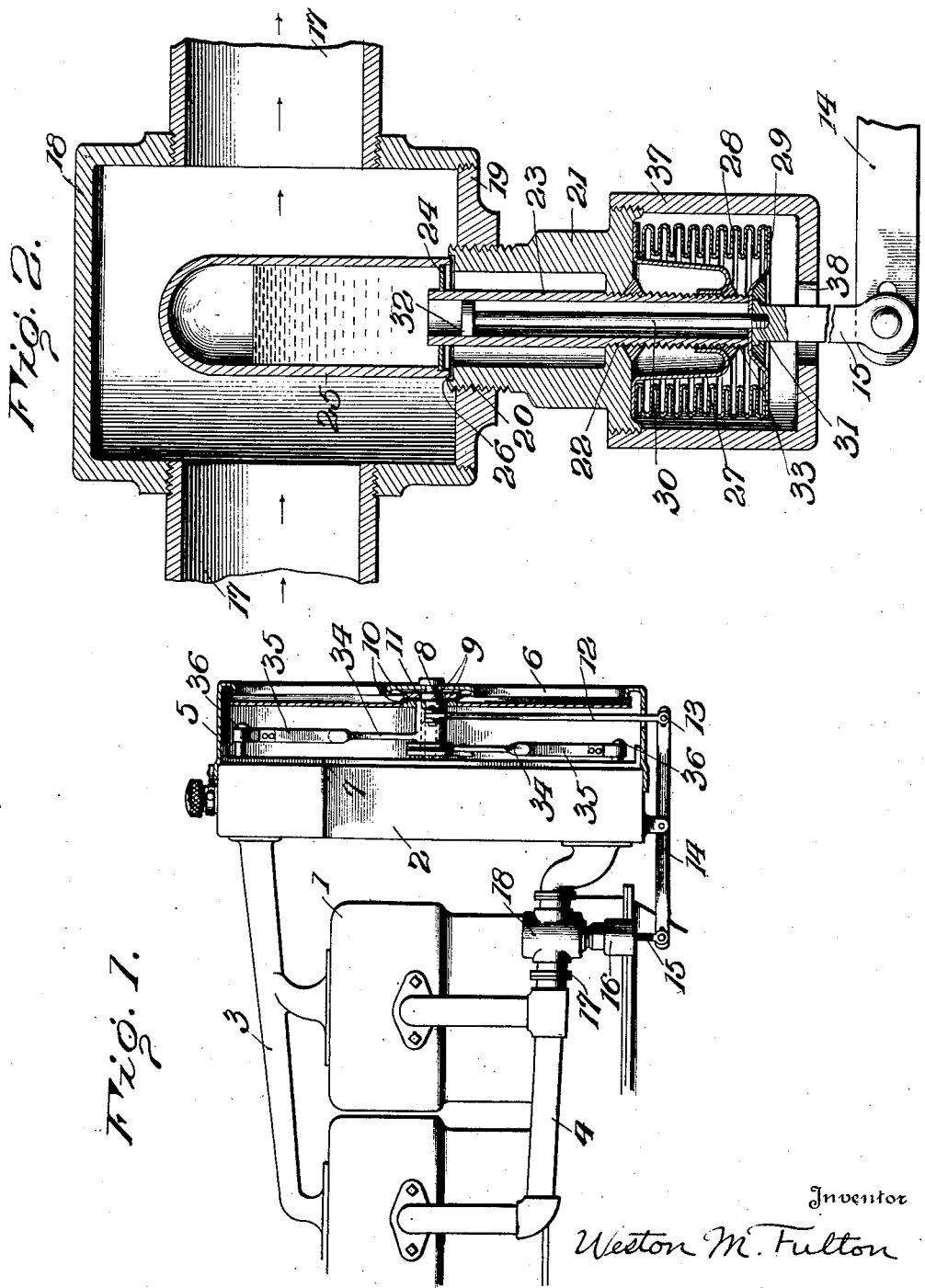
Inventor
Weston M. Fulton
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

AUTOMATIC RADIATOR.

1,251,214.   Specification of Letters Patent.   Patented Dec. 25, 1917.

Application filed July 5, 1916. Serial No. 107,662.

*To all whom it may concern:*

Be it known that I, WESTON M. FULTON, a citizen of United States of America, and a resident of Knoxville, Tennessee, have invented a new and useful Improvement in Automatic Radiators, which invention is fully set forth in the following specification.

This invention relates to automatic thermosensitive devices designed to control the temperature of a heated fluid, and which normally act in response to temperature variations of the fluid with this end in view. An object of this invention is to provide such a device which shall guard against dangerous conditions or injury to the mechanism with which the device is associated, in case the thermosensitive device gets out of order.

More particularly, this invention relates to an automatic thermosensitive device designed to control the temperature of a fluid passing through a radiator and acting in response to temperature variations in such fluid.

It has heretofore been proposed to provide a radiator designed for the cooling of a heated fluid passing therethrough, with means to regulate the flow of cooling medium past or through the radiator, such means in the case of an automobile radiator taking the form of movable shutters or dampers to regulate the flow of air past or through the radiator, such shutters or dampers being connected with a thermosensitive device controlled by the fluid, as water, passing through the cooling system of the engine and hence through the radiator. Under normal conditions the thermosensitive device maintains the shutters or dampers closed while starting the engine and until the temperature of the fluid in the cooling system rises to a given degree. Thereafter, further increase of temperature of the fluid in the cooling system effects through the thermosensitive device a proportional opening of the shutters or dampers to admit the flow of air past the radiator. Prior devices of this type, however, have had the grave objection that in case of injury to the thermosensitive device, as the occurrence of a leak therein, the shutters or dampers were left in the position in which they might be at the time of the accident or else were moved to closed position. If the injury was not discovered, the engine would become overheated through failure to admit the proper quantity of air to the radiator to maintain the cooling fluid at the requisite temperature, with a resultant injury to or destruction of engine parts. It is an object of this invention to provide a device which shall entirely overcome the above objections, and to provide one which, upon failure of the thermosensitive device to properly function, shall automatically assume a position of safety.

Another object of this invention relates to the provision of a device wherein the temperature regulating means is moved to its position of safety by a force acting externally on the thermosensitive device either with or without the assistance of an elastic force inherent in said thermosensitive device.

A further object of this invention is to provide a device of the type described which may readily be detached during warm weather when its use is unnecessary. Other objects will appear as the description proceeds.

Stated generally, the invention, in one aspect, comprises in combination with a radiator, a shutter or damper device for regulating the flow of cooling medium past said radiator, such shutter or damper device having a position of safety admitting the maximum flow of cooling medium past the radiator, and a thermosensitive device for actuating said shutter or damper device, said thermosensitive device being shown as positioned so as to be controlled by the temperature of the fluid passing through the radiator, and having a tendency to move the shutter or damper device to such position of safety, which tendency may be due to inherent elasticity or an elastic force applied thereto, or both. In another aspect, it comprises, in combination with a cooling system, means for governing the cooling effect of such system, shown as a shutter or damper device for regulating the flow of air through a radiator, and a thermosensitive device operatively connected with said governing means,—said thermosensitive device comprising means applied externally thereto and tending to move said governing means to its position of safety upon failure of the temperature control.

While, for the purposes of illustration, one embodiment of this invention has been shown in the accompanying drawings, it is to be expressly understood that such embodiment is for purposes of illustration only, and is not to be construed as a definition of the limits of this invention, reference being had to the appended claims for that purpose.

Referring to the drawings, wherein the same characters represent corresponding parts throughout, Figure 1 is an elevation illustrating the application of this invention to the radiator of an automobile engine;

Fig. 2 is a vertical cross section of the thermosensitive device on an enlarged scale.

1 represents an engine of any preferred type provided with a cooling system through which flows a cooling fluid, as water, such system including the radiator 2. The cooling fluid passes from the jackets of the engine, through pipe 3 to the radiator, whence it returns to the jackets through the pipe 4.

Positioned in the path of the cooling medium flowing past or through the radiator is a shutter or damper device which may take any suitable form. While, for the purposes of illustration, a damper device such as illustrated and claimed in my application Serial No. 107,661, filed July 5, 1916 has been shown, it is to be expressly understood that the invention is not restricted to the use of any particular form of damper device. In the embodiment illustrated, 5 is a shell designed to be positioned in front of the radiator 2 and is preferably detachably connected with such radiator to enable its ready removal when the device is not necessary, as is generally the case in warm weather. The front face of this shell is provided with a plurality of openings 6. Extending across the shell parallel to the front face thereof is a bar 7, and mounted in said bar and the central unperforated portion of the front wall of the shell is a pin or rivet 8. Rotatably mounted on the pin 8 are sleeves 9 carrying vanes 10 adapted to open and close the openings 6. The outermost sleeve is provided with a crank-arm 11 for rotating such sleeve, and means are provided on the vanes connected with such outer sleeve whereby rotation of such sleeve beyond a predetermined limit produces a corresponding rotation of the inner sleeve together with its vanes. Pivotally connected with the crank-arm 11 is a link 12 which is in turn pivoted at 13 to one arm of a walking-beam 14, pivotally connected at its opposite end to the actuating member 15 of a thermosensitive device generally represented in Fig. 1 at 16.

While any one of a large number of thermosensitive devices may be employed so long as it embodies a construction whereby there is an elastic force tending to move the damper means to safety position, that chosen for illustration is of the general type described in my Patent No. 1,153,214, dated September 14, 1915.

In order that the thermosensitive device may be readily removed when its use is not necessary, as in warm weather, pipe 4 is preferably provided with a detachable section 17 having an enlarged portion or casing 18 so that the obstruction offered by the bulb of such thermosensitive device shall not reduce the net area for the passage of the cooling fluid. Wall 19 of this enlargement is provided with a screw-threaded opening 20 receiving the exteriorly threaded tubular portion 21 of the thermosensitive device. Tubular portion 21 is provided with a threaded opening at 22 receiving an exteriorly threaded tubular member 23 which extends through the tubular portion 21 and projects a short distance beyond the end thereof. Supported upon the projecting end of tubular member 23, by means of an annular plate 24, is the bulb 25 of the thermosensitive device. Annular plate 24 is soldered or otherwise hermetically secured to both the tubular member 23 and the bulb 25. It will be observed that the bulb 25 is supported slightly out of engagement with the tubular portion 21, enabling a circulation of the cooling fluid through the space between the annular plate 24 and the end of the tubular portion 21, the latter portion being provided with an annular shoulder 26 loosely embracing the bulb to center the same.

Tubular member 23 at its opposite end is received in the reëntrant end of the stationary wall 27 of the expansible and collapsible vessel 28 of the thermosensitive device. Wall 27 is soldered or otherwise secured to the tubular member 23 to produce a fluid-tight joint. Vessel 28 is preferably formed of corrugated elastic material, such as brass, and is provided with a movable end wall 29 carrying coaxially therewith one end of the actuating member 15.

Mounted within the tubular member 23 is a guide rod 30 received at one end in the actuating member 15 by a screw-threaded connection at 31, and carrying at its opposite end a piston-like member 32 which loosely fits the bore of tubular member 23.

Vessel 28, tubular member 23 and bulb 25 are charged with a volatile liquid at reduced pressure, the pressure within the vessel at all temperatures below that at which the shutter or damper device is to be opened wide being below atmospheric pressure or the exterior pressure to which the vessel 28 is normally subjected. The projecting end 33 of tubular member 23 operates as a stop for the movable end wall 29 of vessel 28. As the external pressure operating on the vessel 28 is greater than the internal pressure, the movable end wall 29 at normal temperatures, or those below that at which the thermosensitive device is designed to operate, is held against the stop provided by said end 33. Exterior means may be provided for normally urging the damper device to open position. In the embodiment illustrated on the drawing, the sleeves 9 of such device are each provided with a crank-arm 34 against which bears a leaf spring 35 mounted at 36 on the bar 7, the springs 35 exerting a tension upon the crank-arms 34 urging the vanes 10 in a direction to uncover the openings 6. If such means normally tending to open the damper device is employed, the difference between the external and the internal pressure acting on the vessel 28 must be such as, to overcome the tension of the springs 35 and maintain the vessel collapsed against the stop 33 at normal temperatures, or those at which the thermosensitive device is designed to be inoperative. Vessel 28 is preferably provided with an inclosing casing 37 which may be conveniently screwed to the tubular portion 21, such casing having an opening at 38 through which operates the actuating member 15.

Assume that the thermosensitive vessel 28, tubular member 23 and bulb 25 have been charged as described and that vessel 28 is in its collapsed condition at a temperature at which the damper device is to remain closed, and that the elasticity of the collapsed walls of the vessel provides sufficient power to operate the damper device when aided by springs 35. Shell 5 is secured in front of radiator 2 and section 17 is substituted for the corresponding removable section of pipe 4, the thermosensitive device having previously been engaged and secured within the enlargement 18. When the engine is cool, the vessel 28 is collapsed until the movable end wall 29 rests against the stop provided by the projecting end 33 of tubular member 23. In such position actuating member 15, through rocking beam 14 and link 12, maintains the vanes 10 in a position to close the openings 6. On starting the engine the cooling fluid, as water, begins to circulate through the jackets of the engine 1, through pipe 3, radiator 2, and back through pipe 4, thereby passing over the bulb 25 of the thermosensitive device. As the engine warms up, the temperature of the cooling fluid rises, causing vaporization of some of the volatile liquid contained in the thermosensitive device. Thereupon the thermosensitive vessel expands, and movable end wall 29 moves away from the stop 33 and, through the operating elements, begins to open the damper device. Continued expansion of the thermosensitive vessel eventually opens wide such damper device.

During the normal operation of the device, the vessel 28 is more or less collapsed owing to the excess of the external pressure over the internal pressure, such excess of pressure being balanced by the elasticity inherent in said vessel, and by the resiliency of the springs when such are used, tending to move the damper device to its wide-open position. Should the thermosensitive device leak as a result of accident, and fail to respond to changes of temperature, the pressure within and without the vessel 28 becomes equalized, whereupon the inherent elasticity of such vessel, aided by the springs when used, moves, through the connecting mechanism, the damper device to its position of safety which, under the conditions assumed, is a position wherein the openings 6 are entirely uncovered. This latter operation, it will be observed, will occur whether the vessel 28 at the time of the accident is entirely collapsed or partially expanded, as equalization of the internal and external pressures leaves an unbalanced force constituted by the inherent elasticity of said vessel, and the springs 35 when used, acting substantially throughout the operative range of movement of the damper-actuating mechanism.

While it is preferred to construct the walls of the expansible and collapsible vessel of a resilient metal, this is not essential, since the walls might be of non-resilient material arranged to collapse against the tension of a spring. It is only essential that the collapse shall take place against some elastic force inherent in or acting on the vessel itself, whether such force be found in the metal walls of the vessel or a spring contained therein or otherwise.

The guiding rod with its piston-like member 32 serves the double function of guiding the movement of the movable end wall 29, and of preventing the jar of the automobile from setting up a vibration of the movable end wall and the damper and damper-operating connections, since the loose fit of the piston-like member 32 in the bore of tubular member 23, while permitting a slow passage of fluid from one side to the other in the normal operation of the thermosensitive device, prevents a rapid passage of such fluid, whereby such piston-like member operates as the corresponding member of a dash-pot.

While the invention has been described as applied to regulation of the cooling medium flowing past the radiator of an automobile, it will be readily understood that the invention is of equal utility when applied to the regulation of a cooling medium flowing past a radiator wherever it is essential that, upon failure of the temperature control of the thermosensitive device, the regulating means shall assume a position of safety.

While the thermosensitive device has been shown as positioned in the pipe 4 of the cooling system, it will be understood that it may be positioned equally well in any other suitable portion of the cooling-system, having regard to the temperature of the fluid flowing past that point when determining the temperature at which such device shall begin to open the aforesaid damper device.

What is claimed is:

1. In an automobile, the combination with the engine and the water-cooling system therefor including a radiator, of means controlled by the temperature of the cooling water for regulating the flow of air through the radiator so constructed as to admit the maximum flow of air therethrough upon failure of said temperature control.

2. In an automobile, the combination with the engine and the fluid-cooling system therefor including a radiator, of movable means for regulating the flow of air through the radiator, one position of which means is a position of safety, and means controlled by the temperature of the cooling fluid for actuating said regulating means, said last-named means being so constructed as to move said regulating means to said position of safety upon failure of the temperature control.

3. In an automobile, the combination with the engine and the fluid-cooling system therefor including a radiator, of movable means for regulating the flow of air through the radiator, and thermosensitive means controlled by the temperature of the cooling fluid for actuating said regulating means, said thermosensitive means being so constructed as to have an inherent tendency to open wide said regulating means upon said thermosensitive means becoming non-responsive to temperature changes.

4. In an automobile, the combination with the engine and the fluid-cooling system therefor including a radiator, of movable means for regulating the flow of air through the radiator, an expansible and collapsible vessel subjected to said cooling fluid, said vessel being collapsible against an elastic force inherent in said vessel and having a thermosensitive fluid sealed therein, said fluid exerting an internal pressure on said vessel less than the external pressure to which said vessel is subjected, and operative connections between the movable wall of said vessel and said regulating means such that expansion of said vessel opens said regulating means.

5. In an automobile, the combination with the engine and the fluid-cooling system therefor including a radiator, of means for varying the admission of air to said radiator, an expansible and collapsible vessel subjected to the cooling fluid and collapsible against an elastic force inherent in said vessel and having a thermosensitive fluid sealed therein, said fluid exerting an internal pressure on said vessel less than the external pressure to which said vessel is subjected, and operative connections between the movable wall of said vessel and said regulating means to open said regulating means in proportion to the expansion of said vessel and to open said regulating means wide upon leakage of said vessel.

6. In combination with a radiator, movable means for varying the quantity of cooling medium flowing past the radiator, thermosensitive means controlled by the temperature of the fluid being cooled in said radiator, and operative connections between the aforesaid means, said thermosensitive means being so constructed as to move said first-named means to a position admitting the maximum flow of cooling medium past said radiator upon failure of said temperature control.

7. In combination with a radiator, movable means for regulating the quantity of cooling medium flowing past the radiator, one position of which means is a position of safety, thermosensitive means controlled by the temperature of the fluid being cooled in said radiator, and operative connections between the aforesaid means, said thermosensitive means being so constructed as to move said regulating means to its position of safety upon failure of said temperature control.

8. In combination with a radiator, movable means for regulating the quantity of cooling medium flowing past the radiator, and an expansible and collapsible vessel operatively connected with said regulating means and subjected to the fluid being cooled in said radiator, said vessel having a thermosensitive fluid sealed therein and having an inherent elastic tendency to move said regulating means to a position admitting the maximum flow of cooling medium past said radiator.

9. In combination with a radiator, movable means for regulating the quantity of cooling medium flowing past the radiator, an expansible and collapsible vessel subjected to the fluid being cooled in said radiator, said vessel being collapsible against an elastic force inherent in said vessel and having a thermosensitive fluid sealed therein, said fluid exerting an internal pressure on said vessel less than the external pressure to which said vessel is subjected, and operative connections between the movable wall of said vessel and said regulating means such that expansion of said vessel opens said regulating mean.

10. In combination with a radiator, movable means for regulating the quantity of cooling medium flowing past the radiator, an expansible and collapsible vessel subjected to the fluid being cooled in said radiator, said vessel being collapsible against an elastic force inherent in said vessel and having a thermosensitive fluid sealed therein, said fluid exerting an internal pressure on said vessel less than the external pressure to which said vessel is subjected, and operative connection between the movable wall of said vessel and said regulating means to open said regulating means in proportion to the expansion of said vessel and to open said regulating means wide upon leakage of said vessel.

11. In combination with a radiator, movable means for regulating the quantity of radiator cooling medium flowing past said radiator, and thermosensitive means operatively connected to said regulating means, said thermosensitive means being so constructed as to move said regulating means to a position admitting the maximum flow of cooling medium past said radiator upon failure of said temperature control.

12. In combination with a radiator, movable means for regulating the quantity of radiator cooling medium flowing past said radiator, one position of said means being a position of safety, and thermosensitive means operatively connected to said regulating means, said thermosensitive means being so constructed as to move said regulating means to its position of safety upon failure of said temperature control.

13. In combination with a radiator, movable means for regulating the quantity of radiator cooling medium flowing past said radiator, and an expansible and collapsible vessel operatively connected with said regulating means and having a thermosensitive fluid sealed therein, said vessel having an inherent elastic tendency to move said regulating means to a position admitting the maximum flow of cooling medium past said radiator.

14. In combination with a radiator, movable means for regulating the quantity of radiator cooling medium flowing past said radiator, and an expansible and collapsible vessel operatively connected to said regulating means and opening the latter by expansion, said vessel being collapsible against an elastic force inherent in said vessel and having a thermosensitive fluid sealed therein, said fluid exerting an internal pressure on said vessel less than the external pressure to which said vessel is subjected.

15. In combination with a radiator, movable means for regulating the quantity of radiator cooling medium flowing past said radiator, one position of said means being a position of safety, and thermosensitive means operatively connected to said regulating means, said thermosensitive means having an inherent elastic tendency to move said regulating means to its position of safety.

16. In combination with a radiator, movable means for regulating the quantity of radiator cooling medium flowing past said radiator, one position of said means being a position of safety, thermosensitive means operatively connected to said regulating means, said thermosensitive means having an inherent elastic tendency to move said regulating means to its position of safety, and spring means normally urging said regulating means to its position of safety.

17. In combination with a radiator, movable means for regulating the quantity of cooling medium flowing past said radiator, one position of said means being a position of safety, and thermosensitive means subjected to the fluid flowing through said radiator and operatively connected to said regulating means, said thermosensitive means having an inherent elastic tendency to move said regulating means to its position of safety.

18. In combination with a radiator, movable means for regulating the quantity of radiator cooling medium flowing past said radiator, one position of said means being a position of safety, thermosensitive means subjected to the fluid flowing through said radiator and operatively connected to said regulating means, said thermosensitive means having an inherent elastic tendency to move said regulating means to its position of safety, and spring means normally urging said regulating means to its position of safety.

19. In combination with a radiator, movable means for regulating the quantity of radiator cooling medium flowing past said radiator, and an expansible and collapsible vessel operatively connected to said regulating means, said vessel being collapsible against an elastic force inherent in said vessel and having a thermosensitive fluid sealed therein, said fluid exerting an internal pressure on said vessel less than the external pressure thereon substantially throughout the operative range of movement of said regulating means.

20. In combination with a radiator, movable means for regulating the quantity of cooling medium flowing past said radiator, and an expansible and collapsible vessel operatively connected to said regulating means and subjected to the fluid flowing through said radiator, said vessel being collapsible against an elastic force inherent in said vessel and having a thermosensitive fluid sealed therein, said fluid exerting an internal pressure on said vessel less than the external pressure thereon substantially throughout the operative range of movement of said regulating means.

21. In combination with a cooling system, means for governing the cooling effect of said system, said means having a position of safety, and thermosensitive means operatively connected to said governing means, said thermosensitive means having a device external thereto and acting on said governing means with a tendency to move said governing means to its position of safety upon failure of the temperature control.

22. In combination with a cooling system, means for governing the cooling effect of said system, said means having a position of safety, and thermosensitive means operatively connected to said governing means, said thermosensitive means having a spring external thereto and acting on said governing means with a tendency to move said governing means to its position of safety upon failure of the temperature control.

23. In combination with a cooling system, means for governing the cooling effect of said system, said means having a position of safety, and thermosensitive means operatively connected to said governing means, said thermosensitive means comprising an expansible and collapsible vessel and resilient means thereto acting on and tending to move said governing means to its position of safety upon the occurrence of a leak in said vessel.

24. In combination with a radiator, movable means for regulating the quantity of cooling medium flowing through said radiator, said means having a position of safety, and thermosensitive means operatively connected to said regulating means, said thermosensitive means being provided with a device external thereto, said device acting on said regulating means with a tendency to move the same to its position of safety.

25. In combination with a radiator, movable means for regulating the quantity of cooling medium flowing through said radiator, said means having a position of safety, and thermosensitive means operatively connected to said regulating means, said thermosensitive means being provided with a spring external thereto, said spring acting on said regulating means with a tendency to move the same to its position of safety.

26. In combination, a device for controlling the flow of a fluid, a thermostatic vessel having a movable wall operatively connected to said device, a thermosensitive fluid sealed in said vessel, and resilient means external to said vessel and acting on said controlling device with a tendency to move said device to a predetermined position of safety upon the occurrence of a leak in said thermostatic vessel.

27. In combination, a device for controlling the flow of a fluid, said device having a position of safety, and a thermosensitive device operatively connected to said controlling device, said thermosensitive device having means external thereto and acting on said controlling device with a tendency to move said controlling device to said position of safety upon failure of the temperature control.

28. In combination, a device for controlling the flow of a fluid, said device having a position of safety, and a thermosensitive device operatively connected to said controlling device, said thermosensitive device having a spring external thereto and acting on said controlling device with a tendency to move said controlling device to said position of safety upon failure of the temperature control.

29. In combination, a device for controlling the flow of a fluid, said device having a position of safety, a vessel charged with a thermosensitive fluid and having a wall movable in response to changes of pressure of said fluid, said wall being operatively connected to said controlling device, and means external to said vessel and acting on said controlling device with a tendency to move said controlling device to its position of safety upon the occurrence of a leak in said vessel.

30. In combination, a device for controlling the flow of a fluid, said device having a position of safety, a vessel charged with a thermosensitive fluid and having a wall movable in response to changes of pressure of said fluid, said wall being operatively connected to said controlling device, and a spring external to said vessel and acting on said controlling device with a tendency to move said controlling device to its position of safety upon the occurrence of a leak in said vessel.

In testimony whereof I have signed this specification.

WESTON M. FULTON.